United States Patent [19]

Cziptschirsch et al.

[11] 4,411,467
[45] Oct. 25, 1983

[54] FOIL COVERING LAYER FOR SUN VISOR

[75] Inventors: Kurt Cziptschirsch, Wuppertal; Klaus-Peter Kaiser, Wermelskirchen; Gerhard Zwirner, Haan, all of Fed. Rep. of Germany

[73] Assignee: Gebr. Happich GmbH, Fed. Rep. of Germany

[21] Appl. No.: 231,034

[22] Filed: Feb. 4, 1981

[30] Foreign Application Priority Data

Mar. 22, 1980 [DE] Fed. Rep. of Germany ....... 3011158

[51] Int. Cl.³ .............................................. B60J 3/00
[52] U.S. Cl. .................................. 296/97 H; 362/74; 362/135; 362/142; 362/144; 428/71
[58] Field of Search ................... 5/470, 471, 468, 461; 29/91, 91.1, 91.2, 91.3, 91.4, 91.5, 448; 38/102, 102.1; 66/178 A, 253, 182, 169, 202, 169 A; 87/2, 5, 11, 61; 297/455; 296/97 H, 97 J, 97 K; 428/253, 224, 225, 226, 98; 460/371, 372, 378; 160/371; 219/213; 362/135, 136, 137

[56] References Cited

U.S. PATENT DOCUMENTS

| 1,356,148 | 10/1920 | Hobert | 5/465 |
| 2,173,214 | 9/1939 | Petersen | 87/2 |
| 3,014,226 | 12/1961 | Wilfert | 5/468 |
| 4,068,930 | 1/1978 | Marcus | 350/277 |
| 4,133,191 | 1/1979 | Blore | 66/197 |

FOREIGN PATENT DOCUMENTS

| 2220711 | 4/1972 | Fed. Rep. of Germany . |
| 7423932 | 10/1974 | Fed. Rep. of Germany . |
| 7721483 | 10/1977 | Fed. Rep. of Germany . |
| 2619844 | 11/1977 | Fed. Rep. of Germany . |
| 7921916 | 11/1979 | Fed. Rep. of Germany . |
| 7900312 | 12/1979 | Fed. Rep. of Germany . |
| 2365454 | 9/1977 | France . |
| 1039241 | 4/1964 | United Kingdom . |

Primary Examiner—Robert R. Song
Assistant Examiner—Dennis Pedder
Attorney, Agent, or Firm—Ostrolenk, Faber, Gerb & Soffen

[57] ABSTRACT

The disclosure concerns a sun visor for an automotive vehicle wherein the foamed body of the sun visor is surrounded by a covering layer of flexible, foil material. The sun visor body has a recess defined in it for holding a mirror or the housing that supports the mirror. The section of the covering layer overlapping the recess is more expansible than the remainder of the covering layer. To make this section more expansible, it is punched with holes defining a lattice of the material, and various shapes holes are disclosed.

12 Claims, 8 Drawing Figures

FOIL COVERING LAYER FOR SUN VISOR

BACKGROUND OF THE INVENTION

The invention relates to a sun visor, particularly for automotive vehicles, or the like, with a foamed sun visor body which is surrounded by an enveloping foil-like layer of flexible plastic, or the like flexible material, and with a mirror which is secured in a recess in the sun visor body.

Sun visors of the above described type are well known. German Utility Model (Gebrauschsmuster) No. 74 23 932 shows a sun visor with a mirror inserted in a recess of the sun visor body. The mirror is overlapped circumferentially at its edge zone by the edge zone of a window-type opening defined in the enveloping foil layer. The foil layer surrounding the sun visor body, is cemented to it.

Another known sun visor disclosed in German Utility Model (Gebrauchsmuster) No. 79 00 312 includes a mirror inserted in a frame, where the frame with the mirror is placed in a recess of the sun visor body. A window-type opening formed in the enveloping foil includes an edge zone that is welded to a circumferential flange of the frame. In order to cover the welded seam, an additional outer frame is arranged on the mirror frame.

German Published Specification (Offenlegungsschrift) No. 26 19 844 discloses a sun visor with a mirror clamped into an undercut recess of the sun visor body. A window-type opening is formed in the enveloping foil layer surrounding the sun visor body. The edge zone of the opening in the foil layer can be pulled into the recess.

Sun visors mirrors may be illuminated from the front or rear, e.g., those shown in German Utility Models (Gebrauchsmuster) No. 79 21 916 or 77 21 483 (the former Utility Model corresponding to U.S. application No. 160,681, filed June 18, 1980). The mirror together with its supporting frame is inserted in a housing equipped with light sources, and this, in turn, is secured in a recess in the sun visor body. In these known sun visors, too, the sun visor body is surrounded by an enveloping foil layer which has a window-type opening in the region of the mirror. The edge zone of this opening is joined with the housing or mirror frame by cementing or welding.

See also, U.S. Pat. No. 3,751,106.

In all of the above described sun visors, the enveloping foil surrounding the sun visor body is provided with a window-type opening located in the vicinity of the mirror and the recess therefor. The edges of the opening in the foil layers are secured on the mirrors and/or on the mirror frames. This sometimes presents considerable difficulties in practice, because it is necessary for esthetic reasons to keep both the rims of the openings and the fastening seams very clean. But even with very careful work, which means relatively large time and cost expenditures, smudgy spots cannot be completely avoided. In many conventional sun visors, this also produces an uneven course of the circumferential welded seam of the enveloping foil as it extends along the narrow side of the sun visor body. This uneven course of the seam arises because the enveloping foil, which surrounds the sun visor body tightly, is weakened in certain areas by the window-type openings so that the enveloping foil and thus the welded seam can be distorted.

SUMMARY OF THE INVENTION

The primary object of the invention is to simplify the manufacture of a sun visor of the above-described type and to improve its quality.

Another object of the invention is to provide an enveloping foil layer for a sun visor body, which can readily extend into a recess in the visor body.

It is a further object to provide such a layer, which need not have a cut window opening for providing access to the mirror.

It is yet another object of the invention to enable the section of the foil layer that overlies the recess to have greater elasticity then the rest of the foil layer.

It is another object of the invention to ease attachment of the foil layer, as well as the mirror and/or the frame therefor, in the recess in the visor body.

It is a still further object of the invention to reduce that distortion of the foil layer on the sun visor body that arises from the cut window being defined in the foil layer.

According to the invention, the enveloping foil layer also covers the internal walls of the recess containing the mirror or mirror supporting housing. This eliminates the previously required punching of a window-type opening into the enveloping foil and the welding or cementing of the edge zones of the foil material bounding the opening to a mirror frame, or the like. In addition to saving operating steps and thus saving time, it also eliminates the necessity for clean cut edges and for using adhesive or welded seams to secure the foil layer to the mirror or mirror frame or housing. This permits rapid and simple manufacture of a high quality sun visor which is low in price.

An advantageous feature of the invention comprises providing the enveloping foil with a substantially higher elasticity of expansion where it overlaps the recess than over other areas of the foil. It thereby becomes possible to manufacture the sun visor body in a known manner and to surround it with an enveloping foil layer without providing a window-type opening in the foil layer. The mirror can be provided with a frame or be combined with a mirror housing. By inserting this assembly into the recess of the sun visor body where the visor body already has the foil in place, the enveloping foil is pushed into the recess. Due to the higher elasticity of expansion of the foil material section overlapping the recess, the foil then hugs the recess walls and does not tear as it is stretched.

The increased elasticity of expansion in certain sections of the foil can be obtained by designing the enveloping foil as a lattice where it overlaps the recess. Since the entire foil layer, including the lattice region, is comprised of a homogeneous material, the lattice provides a reduced surface area or density of foil material in the lattice region, so that the lattice of the foil can be stretched with less effort than regions of the foil which are not weakened.

The lattice can consist of the foil strips that remain between punched holes in the foil. The reticular structure of the lattice can be produced in a simple manner by means of a punch or for plastic foil material layers by means of an electrode.

The cross sections of the punched holes can be adapted to conditions and can be determined by a few tests. Punched holes of circular or polygonal cross section are preferred. Furthermore, extensions of the punched holes in the regions of the corners of the recess effectively prevent tearing of the enveloping foil, particularly in the case of deep recesses.

If the enveloping foil is to be introduced into a particularly deep recess of a sun visor body and/or if the enveloping foil has low elasticity, the foil strips remaining between the punched holes could have an at least partly zig-zag course, so that the strips of the foil will stretch as they are forced into the recess.

Fastening of the mirror is not made difficult by the invention, even when the mirror is combined with a frame, a mirror cover, or with a housing in which light sources are provided for illumination. Thus, for example, it is possible to design a housing with dowels anchored in the sun visor body. It is also possible to provide attachment points on the bottom of the recess in the sun visor body and to fasten the mirror or the mirror housing by cementing. It is furthermore possible to undercut edges of the recess so that the mirror, a mirror frame or a mirror housing can be secured by simple clamping. Due to the reticular structure of the enveloping foil in the recess area, the passage of electrical wires through the foil in the recess is eased so that the sun visor according to the invention can also be equipped with a mirror which is associated with a light source arranged in the sun visor body.

Other objects and features of the invention will be apparent from the following description of embodiments of the invention considered in conjunction with the accompanying drawings.

DESCRIPTION OF THE PREFERRED EMBODIMENTS

Figure 1:
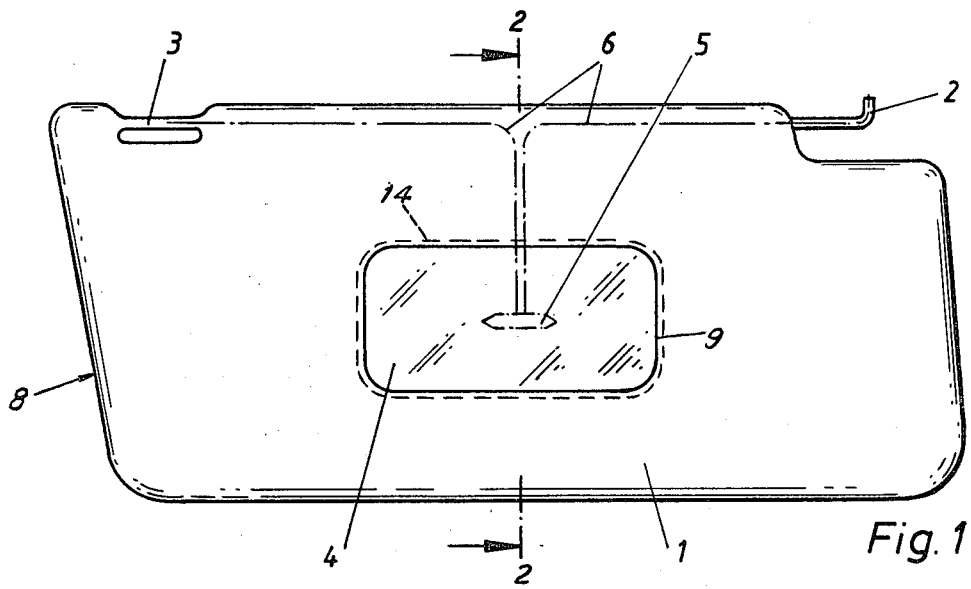
FIG. 1 shows a complete sun visor in an elevation.

FIG. 1 shows a generally rectangular and flat sun visor body. At one side at its upper edge, the visor body has a pivot bearing axle 2, and at the other side at its upper edge, the visor body has an axle 3 of an opposed bearing. Furthermore sun visor body 1 is equipped with a mirror 4. Dot-dashed lines in FIG. 1 indicate a light source 5 for illuminating mirror 4, including electrical wires 6 extending through sun visor body 1, which are connected in a suitable manner with the electrical system of the vehicle. See, for example, U.S. Pat. No. 4,174,864.

Figure 2:
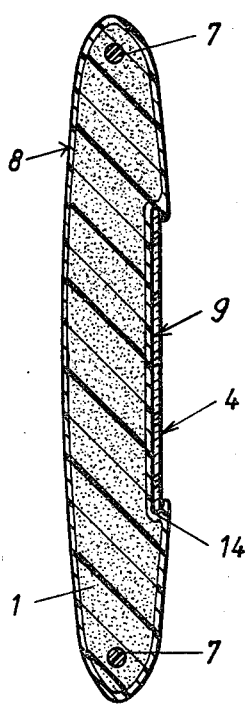
FIG. 2 shows a vertical section substantially along line 2—2 of FIG. 1.
Figure 3:
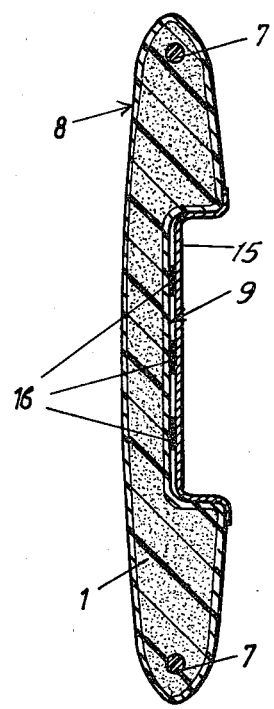
FIG. 3 shows a similar vertical section through a second embodiment of a sun visor.
Figure 4:
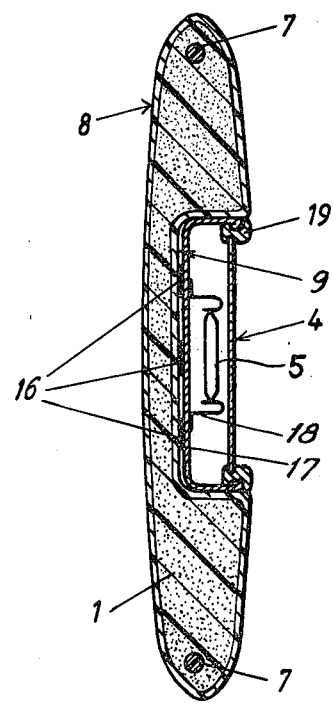
FIG. 4 shows a similar vertical section through a third embodiment of a sun visor, and FIGS. 5-8 each show a section of an enveloping foil for a sun visor in the region where it overlaps the recess in the sun visor body.

As FIGS. 2–4 show, sun visor body 1 is comprised of a plastic foam material and the body is stiffened by an embedded reinforcing insert 7, which can comprise a bent steel wire. Sun visor body 1 is surrounded by an enveloping foil-like layer 8, which generally consists of plastic, but which can also consist of leather or textile material.

Sun visor body 1 has a recess 9 which can vary in its cross section and/or depth, as seen from FIGS. 2–4. The walls of recess 9 are completely covered by the enveloping foil layer 8 that surrounds the visor body. It is possible to pull the enveloping foil 8 into recess 9, since the enveloping foil has a substantially higher elasticity of expansion in its section where it overlaps recess 9. The higher elasticity of expansion of enveloping foil 8 can be achieved, e.g. by providing it with a reticular structure, as shown in FIGS. 5–8, for example.

Figure 5:
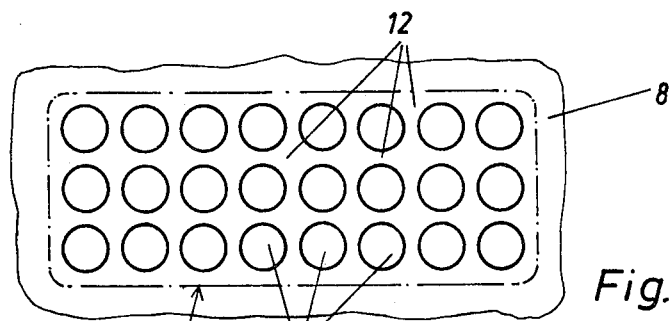

FIG. 5 shows a section of enveloping foil 8 with the recess overlapping section 10 indicated by dot-dashed lines. Overlapping section 10 has a reticular structure which is formed by punched holes 11 with a circular cross section and by the foil strips 12 remaining between the punched holes 11. Due to its reticular structure, overlapping section 10 has a reduced surface area, i.e. there is less material over the entire section 10, so that this section can be more easily stretched and pulled into recess 9.

Figure 6:
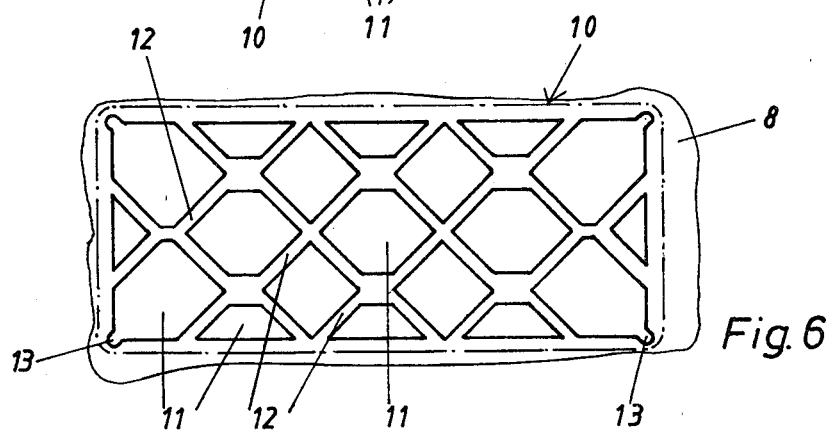

FIG. 6 shows a part of enveloping foil 8 having its recess overlapping section 10 indicated by dot-dashed lines, and which likewise has a reticular structure. Here punched holes 11 are provided with polygonal cross section. This produces foil strips 12 which have a zig-zag course, both in the longitudinal and the transverse directions of recess 9. Stretching of foil strips 12 is thereby made possible, even when the material of the enveloping foil 8 has little elasticity. The punched holes 11 at the corner regions of overlapping section 10 have small cross section corner extensions 13 directed toward the corners of the section 10, which prevent tearing of the foil.

Figure 7:
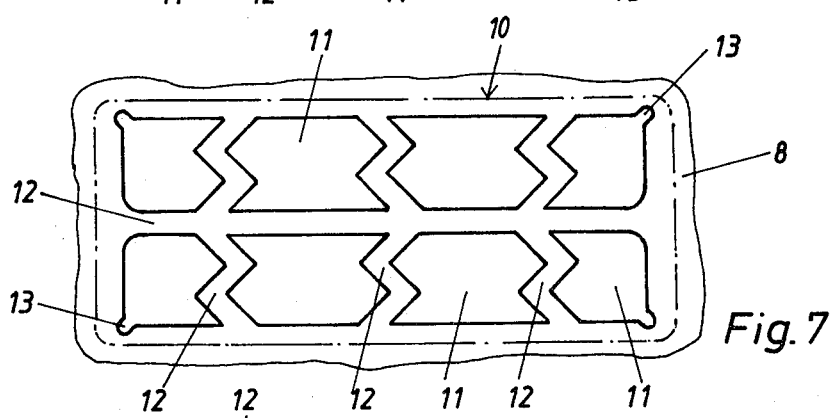

An overlapping foil section similar to that of FIG. 6 is shown in FIG. 7. The foil strips 12, which extend in the transverse direction of recess 9 themselves have a zig-zag course, while the foil strip 12 that is located substantially centrally of the section 10 and extends in the longitudinal direction of recess 9 has a straight course. Here, too, corner extensions 13 are provided in the punched holes 11 at their corners.

Figure 8:
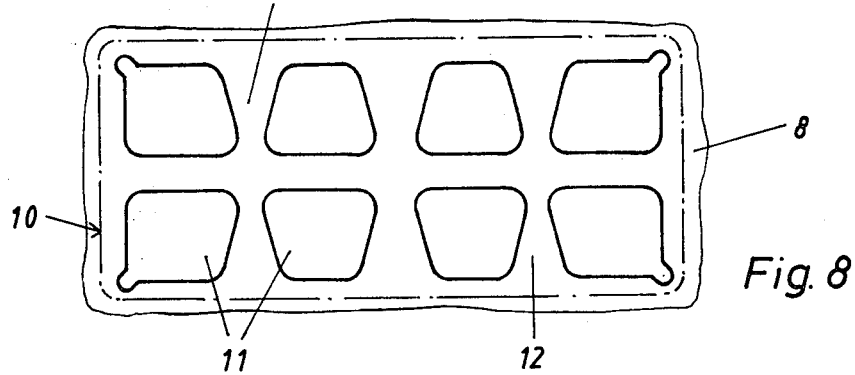

FIG. 8 shows an overlapping foil section 10 with relatively large punched holes 11 that are shaped so that transverse foil strips 12 taper narrower toward the transverse center of the section 10.

Due to any of the above-described reticular structures of enveloping foil 8 at the overlapping section 10 thereof, the foil can be easily pulled into recess 9. This can be done particularly while pressing-in the mirror 4 or the housing in which the mirror is included.

FIG. 2 shows a mirror recess 9 which is provided with a circumferential undercut 14. Mirror 4 is here pressed together with enveloping foil 8 into recess 9 and is then held firmly by the undercut edges of the visor body surrounding the mirror.

FIG. 3 shows a sun visor body 1 with a deeper recess 9, as compared to FIG. 2. A trough shaped plate 15 is pressed into the recess 9, and the enveloping foil 8 is pressed into the recess behind the trough. The trough plate 15 is profiled to the shape of the recess 9 and includes a marginal flange that positions the trough plate and closes off the recess. Trough plate 15 serves to receive a unit comprised of mirror, mirror frame, mirror flap and mirror illumination means. The trough plate is adhered to the bottom of recess 9. Adhesive points 16 are applied on the bottom of recess 9. These protrude through punched holes 11 in enveloping foil 8, so that the bottom of trough plate 15 merely presses against them.

FIG. 4 shows a sun visor body 1 that is provided with a relatively deep recess 9 into which a mirror supporting housing 17, and the enveloping foil 8 behind it, are pressed and are fixed over adhesive points. The mirror housing receives a light source 5 arranged between tubular clamps 18. See U.S. Application Ser. No. 160,681, filed June 18, 1980. The mirror housing also supports a mirror frame 19 equipped with a mirror 4 and is located toward the front of the recess.

Although the present invention has been described in connection with a plurality of preferred embodiments thereof, many variations and modifications will now become apparent to those skilled in the art. It is preferred, therefore, that the present invention be limited not by the specific disclosure herein, but only by the appended claims.

We claim:

1. A sun visor, including a sun visor body having sides, a recess defined in a side of the sun visor body and the recess having side walls of a substantial depth in the visor body for defining the recess;

a covering layer of flexible generally less expansible material surrounding the visor body, the material layer including a section thereof which overlaps the recess, which extends into the recess and which is installed in the recess and contacts the walls thereof and means for making the said covering layer more stretchable than the remainder of the covering layer; the overlapping section of the covering layer being therefore more readily expansible than the remainder of the covering layer, for easing the bringing of the layer into contact with the walls of the recess; said layer of material, at least as it extends over the side of the body and including the section extending into the recess in the body, being an integral piece of the material; said visor further comprising means supporting a mirror, the mirror supporting means being shaped with a profile generally corresponding to the profile defined by the recess, and the layer of the material in the recess being between the walls of the recess and the supporting means.

2. The sun visor of claim 1, further comprising a mirror secured in the recess and being visible at the side of the body.

3. The sun visor of claim 1, wherein the visor body is comprised of a foamed material.

4. The sun visor of claim 1, wherein the overlapping section of the covering layer has the form of a lattice of the material.

5. The sun visor of claim 1, wherein the covering material comprises holes through the material at the section of the layer and strips of the material extend between the holes and define them.

6. The sun visor of claim 5, wherein the holes through the material at the recess section are of circular cross-section.

7. The sun visor of claim 5, wherein the holes through the material at the recess section are of polygonal cross-section.

8. The sun visor of claim 7, wherein the strips of material between the holes have at least a partly zig-zag course.

9. The sun visor of claim 5, wherein the recess has corners and the holes in the section of the layer that are at the corners of the recess have extensions extending outwardly of the section of the covering material.

10. The sun visor of claim 5, wherein the strips of material between the holes have at least a partly zig-zag course.

11. The sun visor of claim 5, wherein the recess section of the covering layer has the form of a lattice of the material.

12. The sun visor of claim 11, wherein the lattice comprises holes through the material at the section of the layer and strips of the material extend between the holes and define them.

* * * * *